US012683210B2

(12) United States Patent
Choi et al.

(10) Patent No.: US 12,683,210 B2
(45) Date of Patent: Jul. 14, 2026

(54) METHOD FOR PRODUCING SECONDARY BATTERY MATERIAL FROM BLACK MASS

(71) Applicants: KOREA ZINC CO., LTD., Gangnam-gu (KR); KEMCO, Gangnam-gu (KR)

(72) Inventors: Chang Young Choi, Gangnam-gu (KR); Je Joong Lee, Gangnam-gu (KR)

(73) Assignees: KOREA ZINC CO., LTD., Seoul (KR); KEMCO, Seoul (KR)

( * ) Notice: Subject to any disclaimer, the term of this patent is extended or adjusted under 35 U.S.C. 154(b) by 0 days.

(21) Appl. No.: 18/472,586

(22) Filed: Sep. 22, 2023

(65) Prior Publication Data

US 2024/0014457 A1     Jan. 11, 2024

Related U.S. Application Data

(63) Continuation of application No. PCT/KR2023/004018, filed on Mar. 27, 2023.

(30) Foreign Application Priority Data

Mar. 31, 2022     (KR) ........................ 10-2022-0040519

(51) Int. Cl.
*H01M 10/54* (2006.01)
*C01D 15/08* (2006.01)
(Continued)

(52) U.S. Cl.
CPC ............ *H01M 10/54* (2013.01); *C01D 15/08* (2013.01); *C22B 1/02* (2013.01); *C22B 7/002* (2013.01);
(Continued)

(58) Field of Classification Search
CPC .. H01M 10/54; H01M 4/0497; H01M 4/1391; C22B 1/02; C22B 7/002; C22B 7/007
See application file for complete search history.

(56) References Cited

U.S. PATENT DOCUMENTS

2015/0311523 A1* 10/2015 Okato ..................... H01M 4/32
                                                    427/126.6
2018/0170763 A1*  6/2018 Byun ................ H01M 10/4242
                          (Continued)

FOREIGN PATENT DOCUMENTS

CA          3173751       10/2021
CN         106544502       3/2017
                          (Continued)

OTHER PUBLICATIONS

EPO machine generated English translation of JP-2012106874-A (Year: 2012).*
                          (Continued)

*Primary Examiner* — Kimberly Wyluda
(74) *Attorney, Agent, or Firm* — HSML P.C.

(57)     ABSTRACT

The embodiments disclosed herein relates to a method for producing a secondary battery material from black mass. The method for producing a secondary battery material from black mass according to one embodiment includes a roasting step of roasting black mass, a pre-extraction step of leaching a roasted black mass roasted in the roasting step with water to separate a lithium solution and a cake, a first evaporation concentration step of producing lithium carbonate crystals by evaporating and concentrating the lithium solution produced in the pre-extraction step, a leaching step of leaching the cake separated in the pre-extraction step, a first purification step of removing copper and aluminum from the leaching solution produced in the leaching step, a post-extraction step of neutralizing the solution prepared in the first purification step and separating the solution into a lithium solution and a cake containing Ni, Co, and Mn (NCM cake), a feeding step of feeding the lithium carbonate crystals produced in the first evaporation concentration step
(Continued)

and the lithium solution prepared in the post-extraction step to a lithium hydroxide production step.

12 Claims, 3 Drawing Sheets

(51) Int. Cl.

| | | |
|---|---|---|
| *C22B 1/02* | (2006.01) | |
| *C22B 7/00* | (2006.01) | |
| *H01M 4/04* | (2006.01) | |
| *H01M 4/1391* | (2010.01) | |

(52) U.S. Cl.
CPC .......... *C22B 7/007* (2013.01); *C01P 2006/40* (2013.01); *H01M 4/0497* (2013.01); *H01M 4/1391* (2013.01)

(56)  References Cited

U.S. PATENT DOCUMENTS

| | | | | |
|---|---|---|---|---|
| 2019/0153563 A1* | 5/2019 | Liu | ........................ | C02F 1/5209 |
| 2019/0345582 A1* | 11/2019 | Bourassa | .................. | C25B 9/19 |
| 2021/0032721 A1* | 2/2021 | Hanisch | .................... | C22B 3/08 |
| 2021/0147960 A1 | 5/2021 | Rohde et al. | | |
| 2021/0391606 A1* | 12/2021 | Wang | ..................... | C01G 49/02 |
| 2021/0395859 A1 | 12/2021 | Ding | | |
| 2022/0045375 A1 | 2/2022 | Goda et al. | | |
| 2022/0364203 A1* | 11/2022 | Park | ........................ | C22B 3/44 |

FOREIGN PATENT DOCUMENTS

| | | | | | |
|---|---|---|---|---|---|
| CN | 109881008 A | | 6/2019 | | |
| CN | 111268747 A | * | 6/2020 | ............. | C01G 53/82 |
| CN | 111430829 A | | 7/2020 | | |
| CN | 112646974 A | | 4/2021 | | |
| JP | 2012106874 A | * | 6/2012 | | |
| JP | 2014103004 A | | 6/2014 | | |
| JP | 2014156648 A | | 8/2014 | | |
| JP | 2020072032 A | | 5/2020 | | |
| JP | 2021512215 A | | 5/2021 | | |
| JP | 2021521327 A | | 8/2021 | | |
| JP | 2021172537 A | | 11/2021 | | |
| KR | 101773439 B1 | | 9/2017 | | |
| KR | 1020200117950 A | | 10/2020 | | |
| KR | 1020200139692 A | | 12/2020 | | |
| KR | 102493104 B1 | | 1/2023 | | |
| RU | 2486262 C2 | | 6/2013 | | |
| RU | 2768719 C1 | | 3/2022 | | |
| TW | 201944647 | | 11/2019 | | |
| WO | 2019197192 | | 10/2019 | | |
| WO | 2020212546 A1 | | 10/2020 | | |
| WO | 2022045973 A1 | | 3/2022 | | |

OTHER PUBLICATIONS

EPO machine generated English translation of CN-111268747-A (Year: 2020).*

LibreTexts (Temperature Dependence of the pH of pure Water) (Year: 2019).*

International Search Report and Written Opinion issued for International Patent Application No. PCT/KR2023/004018, Date of mailing: Jun. 28, 2023, 8 pages.

International Search Report issued for International Patent Application No. PCT/KR2023/004018, Date of mailing: Jun. 28, 2023, 7 pages, English machine translation provided.

The extended European search report issued in European Application No. 23751522.6, mailed Mar. 28, 2025.

Office Action issued by Indonesian Application No. P00202400932, on Dec. 31, 2025, with English translation.

Office Action issued by the Indian Patent Office in Application No. 202417031857, mailed on Apr. 16, 2026, with English translation.

* cited by examiner

Figure 3:
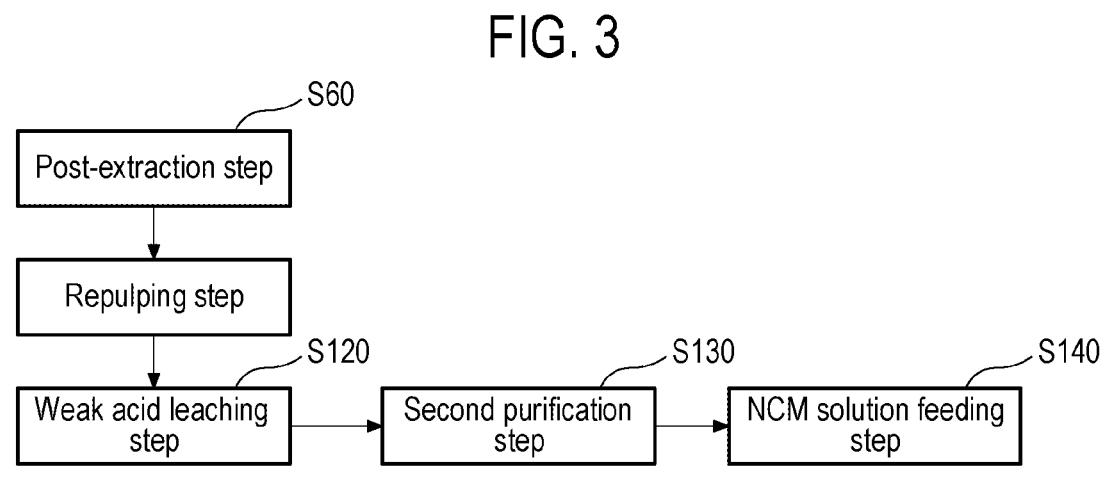

Post-extraction step

↓

Repulping step

↓

S120

Weak acid leaching step → Second purification step (S130) → NCM solution feeding step (S140)

METHOD FOR PRODUCING SECONDARY BATTERY MATERIAL FROM BLACK MASS

TECHNICAL FIELD

The present invention relates to a method for producing secondary battery materials such as lithium and secondary battery precursor raw materials (nickel (Ni), cobalt (Co) and manganese (Mn)) from black mass recovered from secondary battery scrap.

BACKGROUND

In recent years, research for recovering lithium contained in black mass recovered from secondary battery scrap has been continuously conducted. There have been used a pre-extraction method in which black mass is reductively roasted to convert lithium peroxide into lithium carbonate, and then lithium carbonate is distributed in an aqueous lithium solution to extract lithium, or a post-extraction method in which black mass is leached in a complex sulfate solution, and then lithium is separated and extracted in a subsequent step.

In the pre-extraction method, the black mass is reductively roasted in a nitrogen atmosphere to reduce the lithium contained in the black mass into lithium carbonate, and then lithium carbonate is recovered through a water leaching process. Therefore, the impurity concentration is very low, and high-purity lithium carbonate can be recovered. However, due to the limited lithium reduction rate, the lithium recovery rate is only about 85%.

In the post-extraction method, the black mass is extracted with a complex sulfate solution and then lithium is separated. Therefore, the process can be relatively simplified. However, the lithium recovery rate is only about 80% due to considerable lithium losses caused by the residues generated during various impurity removal processes.

In addition, there is a problem in that the amount of additives such as hydrogen peroxide or the like, which is added when extracting the black mass in sulfuric acid solution, varies by more than double depending on whether or not the black mass is roasted.

SUMMARY

An object of the present invention is to solve the problems caused by processes of pre-extracting and post-extracting lithium from black mass, and to improve the recovery rate of lithium and secondary battery precursor metals.

In order to achieve such an object, a method for producing a secondary battery material from black mass according to one embodiment includes: a roasting step S10 of roasting black mass; a pre-extraction step S20 of leaching a roasted black mass roasted in the roasting step S10 with water to separate a lithium (Li) solution and a cake; a first evaporation concentration step S30 of producing lithium carbonate ($Li_2CO_3$) crystals by evaporating and concentrating the lithium (Li) solution produced in the pre-extraction step S20; a leaching step S40 of leaching the cake separated in the pre-extraction step S20; a first purification step S50 of removing copper and aluminum from a leaching solution produced in the leaching step S40; a post-extraction step S60 of neutralizing the solution produced in the first purification step S50 and separating the solution into a lithium (Li) solution and a cake containing Ni, Co, and Mn (NCM cake); and a feeding step of feeding the lithium carbonate ($Li_2CO_3$) crystals produced in the first evaporation concentration step S30 and the lithium (Li) solution produced in the post-extraction step S60 to a lithium hydroxide (LiOH) production step.

The method for producing a secondary battery material from black mass according to one embodiment further includes: a phosphate precipitation step S70 of producing a lithium phosphate ($Li_3PO_4$) cake by adding phosphoric acid ($H_3PO_4$) and sodium hydroxide (NaOH) to the lithium (Li) solution produced in the post-extraction step S60; a sulfate production step S80 of preparing a lithium sulfate ($Li_2SO_4$) solution by dissolving the lithium carbonate ($Li_2CO_3$) crystals produced in the first evaporation concentration step S30 and the lithium phosphate ($Li_3PO_4$) cake produced in the phosphate precipitation step S70 with sulfuric acid; a carbonate precipitation step S90 of precipitating lithium carbonate ($Li_2CO_3$) by adding sodium carbonate ($Na_2CO_3$) to the lithium sulfate ($Li_2SO_4$) produced in the sulfate production step S80; a hydroxide production step S100 of preparing a lithium hydroxide (LiOH) solution by adding calcium oxide (CaO) and water to the lithium carbonate ($Li_2CO_3$); and a second evaporation concentration step S110 of evaporating and concentrating the lithium hydroxide (LiOH) solution prepared in the hydroxide production step S100.

The method for producing a secondary battery material from black mass according to one embodiment further includes: a weak acid leaching step S120 of preparing a solution containing Ni, Co, and Mn (NCM solution) by dissolving the NCM cake produced in the post-extraction step S60 with sulfuric acid; a second purification step S130 of removing impurities from the NCM solution prepared in the weak acid leaching step S120; and a step S140 of feeding the NCM solution passed through the second purification step S130 to, for example, a factory or facility that produces precursor raw materials.

The method for producing a secondary battery material from black mass according to one embodiment further includes: a step of removing residual sodium salt by repulping the NCM cake produced in the post-extraction step S60 twice or more.

The first purification step S50 includes a step of removing copper (Cu) by adding sodium hydrogen sulfide (NaHS) and removing aluminum (Al) by adding sodium hydroxide (NaOH).

The method for producing a secondary battery material from black mass according to one embodiment further includes: a step of separating the lithium sulfate ($Li_2SO_4$) solution produced the sulfate production step S80 into lithium sulfate ($Li_2SO_4$) crystals and a phosphoric acid ($H_3PO_4$) filtrate by evaporating and concentrating the lithium sulfate ($Li_2SO_4$) solution.

The method for producing a secondary battery material from black mass according to one embodiment further includes: a repulping step of removing residual sodium salt from the cake of lithium carbonate ($Li_2CO_3$) produced in the carbonate precipitation step S90.

The method for producing a secondary battery material from black mass according to one embodiment further includes: a step of removing impurities by adding aluminum sulfate ($Al_2(SO_4)_3$) to the solution prepared in the sulfate production step S80.

According to the present invention, it is possible to achieve a recovery rate of lithium (Li) of 92% or more through a high-yield process using black mass recovered from a secondary battery, and it is possible to achieve a recovery rate of nickel (Ni), cobalt (Co) and manganese (Mn) of 95% or more. In addition, it is possible to alleviate environmental pollution problems by recycling a large amount of battery by-products.

According to the present invention, the amount of additives used when leaching sulfuric acid can be reduced through the reductive roasting step for pre-extraction of lithium.

According to the present invention, by controlling the number of repetitions of the purification step and the pH, it is possible to remove impurities up to a concentration required to prepare a high-purity NCM complex sulfate solution.

According to the present invention, by using in combination the pre-extraction step, which is a dry process, and the post-extraction step, which is a wet process, it is possible to improve the recovery rate of valuable metals such as nickel (Ni), cobalt (Co) and manganese (Mn), and to efficiently separate lithium (Li) from black mass.

According to the present invention, the process of recovering lithium from a lithium (Li) solution of a post-extraction step having a high impurity content, and the process of recovering lithium (Li) solution of a pre-extraction step having a relatively low impurity content as lithium carbonate ($Li_2CO_3$) after evaporation and concentration, are separated and managed as separate refinement processes. Therefore, it is possible to reduce the loss of lithium in the lithium refinement process and reduce the processing cost.

BRIEF DESCRIPTION OF THE DRAWINGS

FIG. 3 is a diagram showing a process of preparing a high-purity NCM (Ni, Co, and Mn) solution.

DETAILED DESCRIPTION

Here in after, the present invention will be described with reference to the drawings.

Figure 1:
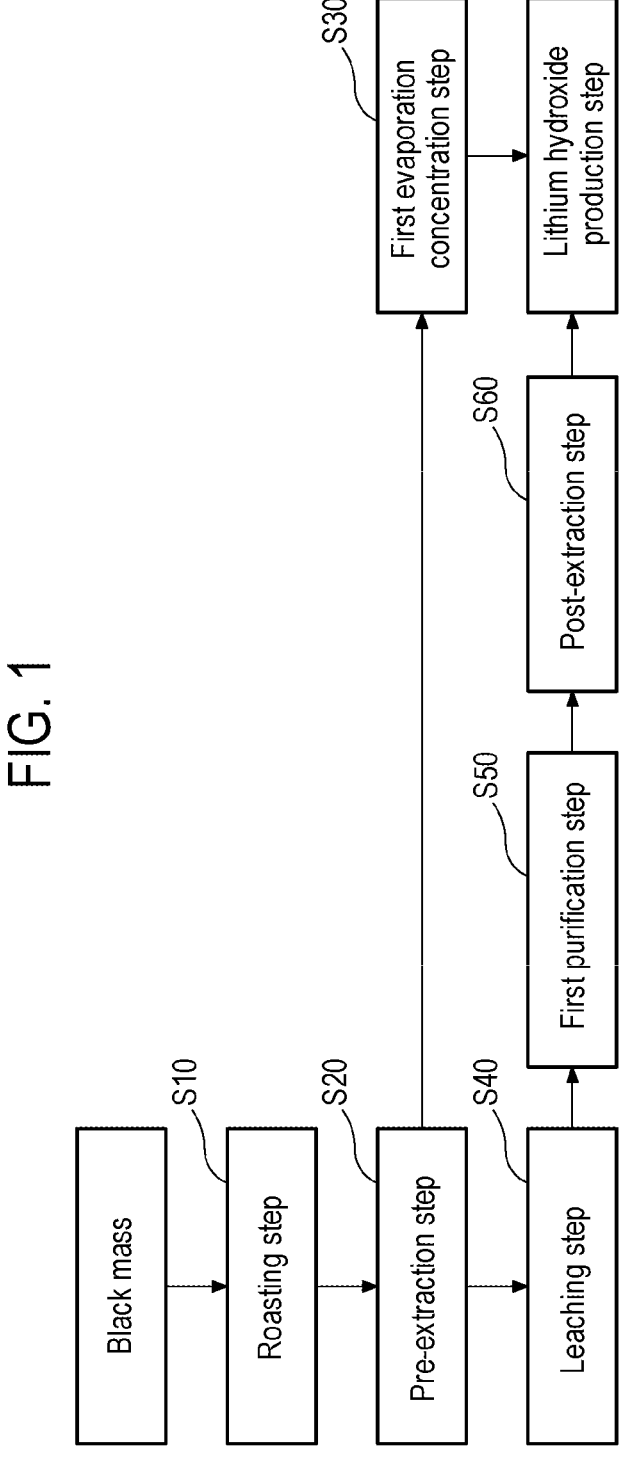
FIG. 1 is a diagram showing a process of feeding lithium (Li) produced from black mass through a pre-extraction step and a post-extraction step to a lithium hydroxide (LiOH) production step.

FIG. 1 is a diagram showing a process of feeding lithium (Li) produced from black mass through a pre-extraction step and a post-extraction step to a lithium hydroxide (LiOH) production process.

Roasting Step S10

This step is a step of putting black mass into a roasting furnace and reductively roasting the black mass in a nitrogen ($N_2$) atmosphere at 800 to 900 degrees C. for 1 to 3 hours. The reaction in the furnace occurs as represented by formula (1) below.

$$2Li(NCM)O_2+2CO \rightarrow Li_2CO_3+NCM+(NCM)O+CO_2 \qquad (1)$$

By roasting the black mass in the nitrogen atmosphere, which is an inert gas atmosphere, lithium (Li) can be converted into a water-soluble form. In the step of reductively roasting the black mass to pre-extract lithium, some high oxide ($Me_2O_3$ where Me=Ni, Co, and Mn) are reduced into low oxides (MeO where Me=Ni, Co, and Mn). Thus, the amount of additive ($H_2O_2$, hydrogen peroxide) used in sulfuric acid leaching is reduced.

Pre-Extraction Step S20

This step is a step of leaching and separating lithium (Li) at 20 to 30 degrees C. for 1 to 3 hours by adding water to the roasted black mass that has been reductively roasted in the roasting step S10. A lithium carbonate ($Li_2CO_3$) solution is prepared in this step. 65% or more of the total lithium (Li) can be extracted and obtained from the reductively roasted black mass by using water.

Through the pre-extraction step S20, it is possible to reduce the operating cost and the additive cost in a subsequent phosphate precipitation step S70, and it is possible to minimize the contamination of impurities in a high-purity lithium hydroxide (LiOH) production step, thereby reducing the processing cost in the lithium hydroxide (LiOH) production step.

First Evaporation Concentration Step S30

This step is a step of producing lithium carbonate ($Li_2CO_3$) crystals by evaporating and concentrating the filtrate of the pre-extraction step S20.

Leaching Step S40

This step is a step of reducing and leaching the cake obtained by pre-extracting lithium in the pre-extraction step S20 with sulfuric acid ($H_2SO_4$) and hydrogen peroxide ($H_2O_2$) at 80 to 85 degrees C. for 8 hours. The reaction formulae are as follows.

$$MeO+H_2SO_4 \rightarrow MeSO_4+H_2O[Me=Ni/Co/Mn] \qquad (2)$$

$$Me_2O_3+2H_2SO_4+H_2O_2 \rightarrow 2MeSO_4+2H_2O+O_2 \qquad (3)$$

$$Me+H_2SO_4 \rightarrow MeSO_4+H_2[Me=Ni/Co/Mn] \qquad (4)$$

When nickel (Ni), cobalt (Co), and manganese (Mn) are leached from the cake in which lithium (Li) is pre-extracted through the pre-extraction step S20, it is possible to minimize the amount of additives used and achieve stable process management in successive steps.

First Purification Step S50

This step is a first purification step configured to remove impurities such as copper (Cu), aluminum (Al), silicon (Si), and the like from the leaching solution (sulfate solution) prepared in the leaching step S40 only by the precipitation reaction which is simpler than the solvent extraction that requires complicated equipment configuration, environmental risk, and high processing cost. This step improves the impurity removal efficiency.

The copper (Cu) removal step is a step of precipitating and removing Cu in the solution as CuS by adding sodium hydrogen sulfide (NaHS) (1.2 eq) and performing reaction at 60 to 80 degrees C. for 4 hours as in the reaction formula (5). As used herein, the unit "eq" refers to an equivalent, and means a certain amount assigned to each element or compound based on the quantitative relationship between substances in a chemical reaction.

$$2CuSO_4+2NaHS \rightarrow 2CuS \downarrow +Na_2SO_4+H_2SO_4 \qquad (5)$$

The aluminum (Al) removal step is a step of precipitating and removing aluminum (Al) as $Al(OH)_3$ by adding sodium hydroxide (NaOH) (pH 4.0 or less) and performing reaction at 70 to 85 degrees C. for 8 hours. The reaction formula is as follows.

$$Al_2(SO_4)_3+6NaOH \rightarrow 2Al(OH)_3 \downarrow +3Na_2SO_4 \qquad (6)$$

In the step of precipitating aluminum (Al) as $Al(OH)_3$, some of Fe and Si are co-precipitated and removed.

Post-Extraction Step S60

This step is a step of precipitating and recovering nickel (Ni), cobalt (Co), and manganese (Mn) by neutralizing the filtrate of the first purification step S50 (pH 10 to 12) with sodium hydroxide (NaOH) and perform reaction at 70 to 85 degrees C. for 4 hours, while distributing and separating lithium (Li) as a filtrate. In the post-extraction step S60, the precipitation rate of nickel (Ni), cobalt (Co), and manganese (Mn) is 99.9% or more.

The filtered NCM cake is repulped at least twice to remove residual sodium salt (Na Salt). Sodium (Na) in the cake is removed from 3.43% to 0.4%.

Figure 2:
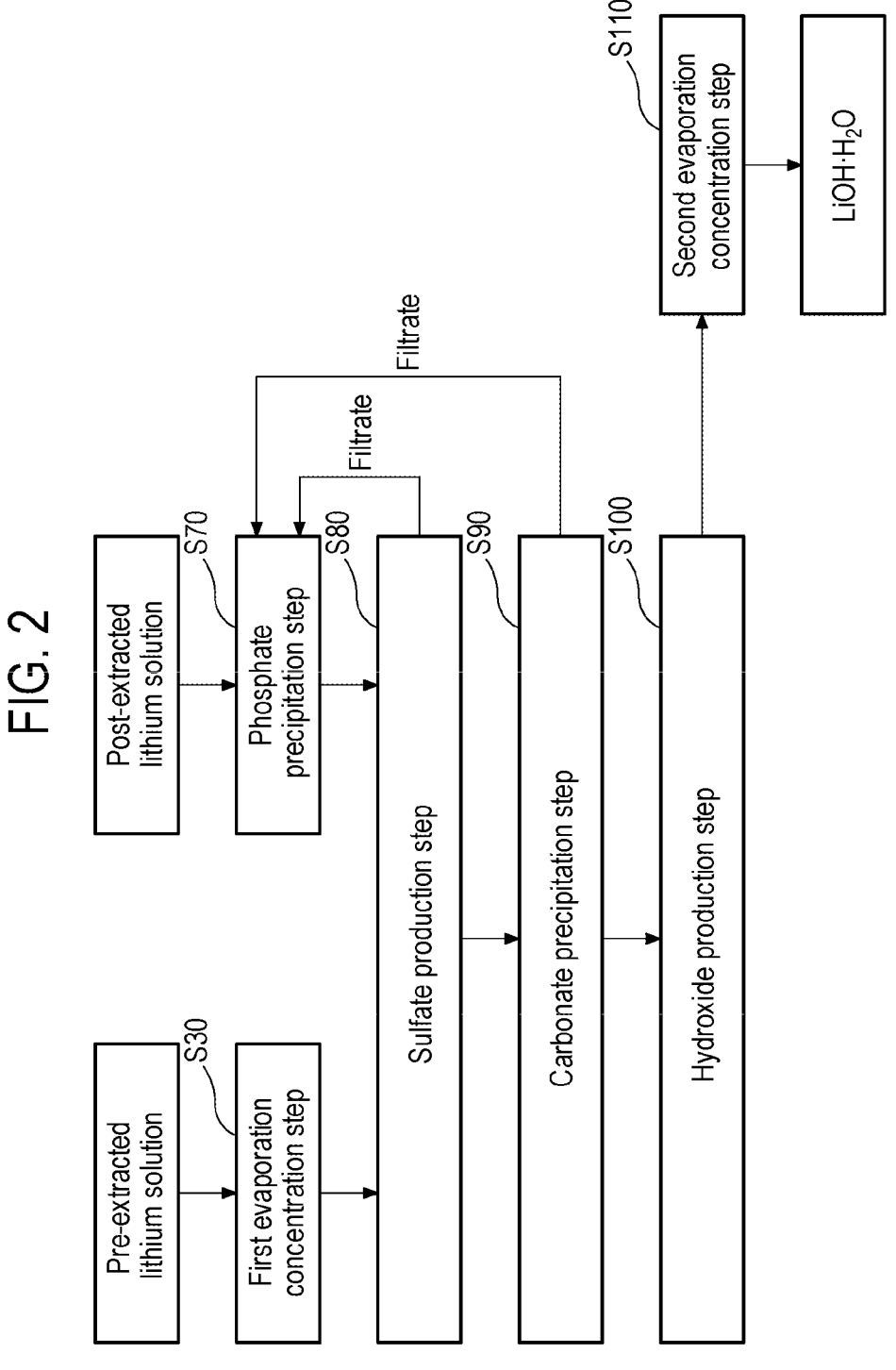
FIG. 2 is a diagram showing a process of producing high-purity lithium hydroxide (LiOH).

FIG. 2 is a diagram showing a process of producing high-purity lithium hydroxide (LiOH).

In the high-purity lithium hydroxide (LiOH) production process, lithium sulfate ($Li_2SO_4$) is produced by adding sulfuric acid to the lithium carbonate ($Li_2CO_3$) recovered through the pre-extraction step S20 and the first evaporation concentration step S30, and the lithium phosphate ($Li_3PO_4$) produced by precipitation from the lithium solution prepared and recovered through the post-extraction step S60, lithium carbonate ($Li_2CO_3$) is produced by adding sodium carbonate ($Na_2CO_3$) to the lithium sulfate, and then a lithium hydroxide (LiOH) solution is prepared, evaporated and concentrated by adding calcium oxide (CaO) to the lithium carbonate ($Li_2CO_3$). This process is a process of producing high-purity lithium carbonate ($Li_2CO_3$) and high-purity lithium hydroxide ($LiOH \cdot H_2O$) with an excellent lithium recovery rate. A specific high-purity lithium hydroxide (LiOH) production process is as follows.

First Evaporation Concentration Step S30

As described above, this step is a step of producing lithium carbonate ($Li_2CO_3$) crystals by evaporating and concentrating the filtrate of the pre-extraction step S20.

Phosphate Precipitation Step S70

This step is a step of precipitating and recovering lithium (Li) in the form of lithium phosphate ($Li_3PO_4$) by adding phosphoric acid ($H_3PO_4$) (1.2 eq) to the lithium (Li) solution prepared in the post-extraction step S60 and performing reaction at 70 to 85 degrees C. for 2 hours. Sodium hydroxide (NaOH) is added to neutralize the solution to pH 10.0 to 12.0. The reaction formulae are as follows.

$$3Li_2SO_4 + 2H_3PO_4 \rightarrow 2Li_3PO_4 \downarrow + 3H_2SO_4 \qquad (7)$$

$$Li_2CO_3 + H_3PO_4 \rightarrow Li_3PO_4 \downarrow + H_2O + CO_2 \qquad (8)$$

$$H_2SO_4 + 2NaOH \rightarrow Na_2SO_4 + 2H_2O \qquad (9)$$

Lithium phosphate ($Li_3PO_4$) has a lower solubility than lithium carbonate ($Li_2CO_3$), and therefore the lithium (Li) precipitation recovery rate (94.0%) is high (the solubility of lithium phosphate ($Li_3PO_4$) is Li 0.07 g/L at 25 degrees C., whereas the solubility of lithium carbonate ($Li_2CO_3$) is Li 2.4 g/L at 25 degrees C.). The concentration of lithium (Li) in the filtrate of the phosphate precipitation step S70 is 0.1 g/L, and the loss of lithium is 6.0%.

Preferably, a step of removing P (0.5 g/l) (phosphorus (P) removal step) may be required to process the filtrate of the phosphate precipitation step S70 with purified water. The phosphorus removal step may be performed at 50 to 70 degrees C. at pH 5.5 to 6.5 for 4 hours. The reaction formula is as follows.

$$Al_2(SO_4)_3 + 2H_3PO_4 \rightarrow 2AlPO_4 + 3H_2SO_4 \qquad (10)$$

Sulfate Production Step S80

This step is a step of preparing a lithium sulfate ($Li_2SO_4$) solution (Li 35 g/l) by leaching, in sulfuric acid, the cake containing lithium phosphate ($Li_3PO_4$) generated in the phosphate precipitation step S70 and the lithium carbonate ($Li_2CO_3$) crystals generated in the first evaporation concentration step S30. At this time, the temperature is 60 to 80 degrees C., the reaction time is 2 hours, and the pH is 2.0 or less. The reaction formula is as follows.

$$2Li_3PO_4 + 3H_2SO_4 \rightarrow 3Li_2SO_4 + 2H_3PO_4 \qquad (11)$$

$$Li_2CO_3 + H_2SO_4 \rightarrow Li_2SO_4 + H_2O + CO_2 \qquad (12)$$

The lithium carbonate ($Li_2CO_3$) recovered by evaporating and concentrating the solution (lithium carbonate ($Li_2CO_3$) solution) prepared in the lithium (Li) pre-extraction step S20 is introduced into the sulfate production step S80.

Since the lithium carbonate ($Li_2CO_3$) does not go through the phosphate precipitation step S70, the amount of phosphoric acid ($H_3PO_4$) and sodium hydroxide (NaOH) used is reduced by 40% or more, and the loss of lithium (Li) distributed as the filtrate of the phosphate precipitation step S70 is greatly reduced.

Preferably, the lithium sulfate ($Li_2SO_4$) solution prepared in the sulfate production step S80 may be evaporated and concentrated to separate lithium sulfate ($Li_2SO_4$) crystals and a phosphoric acid ($H_3PO_4$) filtrate. The phosphoric acid ($H_3PO_4$) filtrate may be recycled to the phosphate precipitation step S70 and may be used as an additive for lithium precipitation. The evaporation condensate generated in the evaporation concentration step may be recycled as a process solution for the lithium (Li) pre-extraction step. Through this, it is possible to reduce the amount of waste water discharged out of the system and the amount of new water flowing into the system.

Carbonate Precipitation Step S90

This step is a step of precipitating lithium carbonate ($Li_2CO_3$) by adding sodium carbonate ($Na_2CO_3$) to the lithium sulfate ($Li_2SO_4$) produced in the sulfate production step S80 and performing reaction at 80 to 85 degrees C. for 4 hours. The reaction formula is as follows.

$$Li_2SO_4 + Na_2CO_3 \rightarrow Li_2CO_3 \downarrow + Na_2SO_4 \qquad (13)$$

Preferably, a repulping step may be performed to remove residual sodium (Na) salt from the cake of the carbonate precipitation step S90. The repulping step is performed at 80 degrees C. (Li 1.6 g/L) to minimize the loss of lithium (Li). The filtrate (Li 1.6 g/L) of the carbonate precipitation step S90 is recycled to the phosphate precipitation step S70.

Preferably, prior to precipitating the lithium carbonate ($Li_2CO_3$), impurities (P, Fe, etc.) in the solution of the sulfate production step S80 may be removed through a phosphorus (P) removal step. Aluminum sulfate ($Al_2(SO_4)_3$) is added to the solution prepared in the sulfate production step S80 to control the pH to 5.0 to 6.0, and reaction is performed at 50 to 70 degrees C. for 4 hours, whereby most of the phosphorus (P) can be removed through precipitation, and iron (Fe) and other impurities can be removed by co-precipitation. The reaction formula is as follows.

$$Al_2(SO_4)_3 + 2H_3PO_4 \rightarrow 2AlPO_4 + 3H_2SO_4 \qquad (14)$$

Hydroxide Production Step S100

This step is a step of adding calcium oxide (CaO) and water to the cake of lithium carbonate ($Li_2CO_3$) produced in the carbonate precipitation step S90 and performing reaction at 70 to 80 degrees C. for 2 hours to prepare a lithium hydroxide (LiOH) solution. The reaction formula is as follows.

$$Li_2CO_3(s) + CaO(s) + H_2O \rightarrow 2LiOH(aq) + CaCO_3(s) \qquad (15)$$

The conversion rate to lithium hydroxide (LiOH) is 95% or more under the condition that the concentration of lithium (Li) in the solution is up to 10 g/L.

Preferably, the hydroxide production step S100 may be performed twice.

Preferably, a repulping step of recovering lithium (Li) contained in the calcium carbonate ($CaCO_3$) residue generated in the hydroxide production step S100 may be performed.

Second Evaporation Concentration Step S110

This step is a step of producing a LiOH·H₂O product by evaporating and concentrating the lithium hydroxide (LiOH) solution prepared in the hydroxide production step S100 in a nitrogen (N₂) atmosphere. The total recovery rate of lithium (Li) up to the LiOH·H₂O production step is 92% or more.

FIG. 3 is a diagram showing a process of producing a high-purity NCM (Ni, Co, Mn) solution, and relates to a process of preparing an NCM solution by sulfuric-acid-leaching and purifying the cake produced in the post-extraction step S60.

In the first purification step S50, the pH may be raised stepwise up to 4 to first remove impurities. Then, in the second purification step S130, the pH may be controlled to 5 to remove impurities up to a concentration required to prepare a high-purity NCM complex sulfate solution. Residues obtained from the second purification step S130 may be reused in the leaching step S40, whereby the recovery rate can be increased by minimizing valuable metals (Ni, Co, Mn, and Li) distributed as residues. The specific process is as follows.

Weak Acid Leaching Step S120

In the post-extraction step S60, the NCM cake from which lithium (Li) is separated is leached (pH 1.5 to 2.5) in sulfuric acid (H₂SO₄) at 60 to 80 degrees C. for 4 hours. A small amount of reducing agent may be added to improve the dissolution rate of the NCM cake, at which time hydrogen peroxide (H₂O₂) may be used as the reducing agent.

Second Purification Step S130

This step is a second purification step of removing copper (Cu) and aluminum (Al) contained in the NCM solution prepared in the weak acid leaching step S120 to 5 mg/L or less, respectively. In a copper removal step, 1.2 eq of sodium hydrogen sulfide (NaHS) is added and reacted at 60 to 80 degrees C. for 4 hours. In an aluminum removal step, reaction is performed at the pH of 4.0 to 5.5 and the temperature of 70 to 85 degrees C. for 8 hours.

NCM Solution Feeding Step S140

The NCM solution from which copper and aluminum are removed through the second purification step S130 is fed to, for example, a factory or facility that produces precursor raw materials to produce substances on a composition-by-composition basis.

Example

In this example, a LiOH·H₂O product and an NCM solution were prepared through the above-described steps. Detailed conditions for the respective steps are as follows.

Roasting step S10: Roasting was carried out at a roasting furnace temperature of 900 degrees C. in a nitrogen (N₂) atmosphere for 2 hours.

Pre-extraction step S20: Water at 25 degrees C. was added to the roasted black mass reductively roasted in the roasting step S10, and leaching was performed for 2 hours.

First evaporation concentration step S30: The filtrate of the pre-extraction step S20 was evaporated and concentrated.

Leaching step S40: Sulfuric acid and 60% hydrogen peroxide (H₂O₂) were added to the cake produced by pre-extracting lithium in the pre-extraction step S20, and leaching was carried out at a temperature of 80 degrees C. for 8 hours based on a nickel (Ni) concentration of 100 g/L in the filtrate and a final pH of 3.0. The hydrogen peroxide (H₂O₂) was added in an amount of 5 wt % of the cake raw material.

First purification step S50: 1.2 eq of 30% sodium hydrogen sulfide (NaHS) was added to the leached solution prepared in the leaching step S40, and a copper (Cu) removal step was performed at a temperature of 70 degrees C. for 4 hours. Thereafter, sodium hydroxide (NaOH) was added (pH 4.0), and an aluminum (Al) removal step was performed at a temperature of 85 degrees C. for 8 hours.

Post-extraction step S60: Sodium hydroxide (NaOH) was added to the filtrate of the first purification step S50 to control the pH to 11.0, and an extraction step was performed at a temperature of 85 degrees C. for 4 hours.

Phosphate precipitation step S70: 1.2 eq of 85% phosphoric acid (H₃PO₄) was added to the lithium (Li) solution prepared in the post-extraction step S60, and sodium hydroxide (NaOH) was added to control the pH to 11.0. A phosphate precipitation step was carried out at a temperature of 70 degrees C. for 2 hours. In addition, 1.5 eq of aluminum sulfate (Al₂(SO₄)₃) was added to purify the filtrate produced in the precipitation step, and a phosphorus (P) removal step was performed at a pH of 6.0 and a temperature of 60 degrees C. for 4 hours.

Sulfate production step S80: Based on the lithium (Li) concentration of 35 g/L, 1.1 eq of sulfuric acid was added to the cake containing lithium phosphate (Li₃PO₄) generated in the phosphate precipitation step S70 and the lithium carbonate (Li₂CO₃) crystals generated in the first evaporation concentration step S30, and a sulfate production step was carried out for 2 hours under pH<2.0 conditions. In addition, the lithium sulfate (Li₂SO₄) solution prepared in the sulfate production step S80 was evaporated and concentrated to separate lithium sulfate (Li₂SO₄) crystals and a phosphoric acid (H₃PO₄) filtrate.

Carbonate precipitation step S90: 1.2 eq of sodium carbonate (Na₂CO₃) was added to the lithium sulfate (Li₂SO₄) produced in the sulfate production step S80, and a precipitation step was performed at a temperature of 85 degrees C. for 4 hours.

Hydroxide production step S100: 1.05 eq of calcium oxide (CaO) and water were added to the lithium carbonate (Li₂CO₃) cake produced in the carbonate precipitation step S90, and a hydroxide production step was carried out at a temperature of 70 degrees C. for 2 hours.

Second evaporation concentration step S110: The lithium hydroxide (LiOH) solution prepared in the hydroxide production step S100 was evaporated and concentrated in a nitrogen (N₂) atmosphere.

Weak acid leaching step S120: 1.0 eq of sulfuric acid (H₂SO₄) and 60% hydrogen peroxide (H₂O₂) were added to the NCM cake from which lithium (Li) was separated in the post-extraction step S60, in an amount of 5 wt % of the NCM cake to perform a leaching step.

Second purification step S130: 1.2 eq of 30% sodium hydrogen sulfide (NaHS) was added to the NCM solution prepared in the weak acid leaching step S120, and a copper (Cu) removal step was performed at a temperature of 60 degrees C. for 4 hours. Thereafter, sodium hydroxide (NaOH) was added to control the pH to 5.0, and an aluminum (Al) removal step was performed at a temperature of 85 degrees C. for 8 hours.

As a result of performing the process according to the present embodiment, it was possible to recover lithium hydroxide (LiOH) corresponding to 92% of the amount of lithium (Li) contained in the black mass. This recovery rate is higher than the lithium recovery rate (85%) in the conventional pre-extraction method and the lithium recovery rate (80%) in the conventional post-extraction method.

In addition, as a result of performing the process according to the present embodiment, 95% of nickel (Ni), cobalt (Co), and manganese (Mn) contained in the black mass could be recovered.

Although the present invention has been described in relation to some embodiments in this specification, it should be noted that various modifications and changes may be made without departing from the spirit and scope of the present invention that can be understood by those skilled in the art. Moreover, such modifications and changes should be construed to fall within the scope of the claims appended hereto.

What is claimed is:

1. A method for producing a secondary battery material from black mass, comprising:

roasting black mass to produce roasted black mass;

leaching the roasted black mass with water to separate a first lithium (Li) solution and a cake;

producing lithium carbonate (Li2CO3) crystals by evaporating and concentrating the first lithium (Li) solution;

leaching the cake separated from the first lithium (Li) solution;

removing copper and aluminum from a leaching solution produced by the leaching of the cake, which includes removing of the copper by adding sodium hydrogen sulfide (NaHS) to the leaching solution and removing the aluminum by adding sodium hydroxide (NaOH) to the leaching solution;

neutralizing the leaching solution and separating the leaching solution into a second lithium (Li) solution and a cake containing Ni, Co, and Mn ("NCM cake"); and feeding the lithium carbonate (Li2CO3) crystals and the second lithium (Li) solution produced by the separating of the leaching solution to a lithium hydroxide (LiOH) production process, which includes:

producing a lithium phosphate (Li3PO4) cake by adding phosphoric acid (H3PO4) and sodium hydroxide (NaOH) to the second lithium (Li) solution produced by the separating of the leaching solution, preparing a lithium sulfate (Li2SO4) solution by co-leaching the lithium carbonate (Li2CO3) crystals and the lithium phosphate (Li3PO4) cake together with sulfuric acid, precipitating lithium carbonate (Li2CO3) by adding sodium carbonate (Na2CO3) to the lithium sulfate (Li2SO4) solution, preparing a lithium hydroxide (LiOH) solution by adding calcium oxide (CaO) and water to the lithium carbonate (Li2CO3), and evaporating and concentrating the lithium hydroxide (LiOH) solution.

2. The method of claim 1, further comprising:

preparing a solution containing Ni, Co, and Mn ("NCM solution") by leaching the NCM cake with sulfuric acid;

removing impurities from the NCM solution; and feeding the NCM solution with the impurities removed to a factory that produces precursor raw materials.

3. The method of claim 2, further comprising:

removing residual sodium salt by repulping the NCM cake twice or more.

4. The method of claim 1, further comprising:

separating the lithium sulfate (Li$_2$SO$_4$) solution into lithium sulfate (Li$_2$SO$_4$) crystals and a phosphoric acid (H$_3$PO$_4$) filtrate by evaporating and concentrating the lithium sulfate (Li$_2$SO$_4$) solution.

5. The method of claim 1, further comprising:

removing residual sodium salt from a cake of lithium carbonate (Li$_2$CO$_3$) produced by the precipitating of the lithium carbonate (Li$_2$CO$_3$).

6. The method of claim 1, further comprising:

removing phosphorous (P), iron (Fe), and other impurities by adding aluminum sulfate (Al$_2$(SO$_4$)$_3$) to the lithium sulfate (Li$_2$SO$_4$) solution to control a pH to be from 5.0 to 6.0.

7. The method of claim 1, wherein 1.2 equivalents of the sodium hydrogen sulfide (NaHS) for removing the copper are added to the leaching solution at a temperature of 60 to 80 degrees C., and wherein the removing of the aluminum is performed at a temperature of 70 to 85 degrees.

8. The method of claim 1, wherein aluminum precipitates as aluminum hydroxide (Al(OH)$_3$ by adding the sodium hydroxide (NaOH) to the leaching solution, and wherein Fe and Si are co-precipitated with the aluminum hydroxide (Al(OH)$_3$.

9. The method of claim 1, wherein the producing of the lithium phosphate (Li$_3$PO$_4$) cake precipitates and recovers lithium (Li) in the form of lithium phosphate (Li$_3$PO$_4$) by adding 1.2 equivalents of the phosphoric acid (H$_3$PO$_4$) to the second lithium (Li) solution at a temperature of 70 to 85 degrees C.

10. The method of claim 2, wherein the removing of the impurities from the NCM solution includes removing copper and aluminum from the NCM solution to 5 mg/L or less, respectively, wherein the removing of the copper from the NCM solution includes adding 1.2 equivalents of sodium hydrogen sulfide (NaHS) to the NCM solution at a temperature of 60 to 80 degrees C., and wherein the removing of the aluminum from the NCM solution occurs at a temperature of 70 to 85 degrees cat a pH of 4.0 to 5.5.

11. The method of claim 2, wherein the removing of impurities from the NCM solution includes removing copper and aluminum from the NCM solution to 5 mg/L or less, respectively, wherein the removing of the copper from the NCM solution includes adding 1.2 equivalents of sodium hydrogen sulfide (NaHS) to the NCM solution at a temperature of 60 to 80 degrees C., and wherein the removing of the aluminum from the NCM solution occurs at a temperature of 70 to 85 degrees C. at a pH 4.0 to 5.5.

12. The method of claim 1, wherein evaporation condensate generated in the producing of lithium carbonate (Li$_2$CO$_3$) crystals and in the evaporating and concentrating of the lithium hydroxide (LiOH) solution is recycled as a process solution for the leaching of the roasted black mass.

* * * * *